United States Patent
Kalavakuru et al.

(10) Patent No.: US 12,526,764 B2
(45) Date of Patent: Jan. 13, 2026

(54) FINE TIME MEASUREMENT IMPROVEMENT FOR ACCESS POINT SELF-POSITIONING

(71) Applicant: Cisco Technology, Inc., San Jose, CA (US)

(72) Inventors: Sivadeep Reddy Kalavakuru, Akron, OH (US); Laurent Alexandre Pierrugues, San Jose, CA (US); Jerome Henry, Pittsboro, NC (US); Behrouz Shayesteh, San Jose, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 363 days.

(21) Appl. No.: 18/194,196

(22) Filed: Mar. 31, 2023

(65) Prior Publication Data
US 2024/0334370 A1 Oct. 3, 2024

(51) Int. Cl.
*H04W 64/00* (2009.01)
*G01S 13/76* (2006.01)
*H04W 56/00* (2009.01)

(52) U.S. Cl.
CPC .......... *H04W 64/00* (2013.01); *G01S 13/765* (2013.01); *H04W 56/006* (2013.01)

(58) Field of Classification Search
CPC .................................................... H04W 64/00
USPC ..................................................... 455/456.1
See application file for complete search history.

(56) References Cited

U.S. PATENT DOCUMENTS

| | | | |
|---|---|---|---|
| 2014/0087751 A1* | 3/2014 | Do | G01S 13/878 455/456.1 |
| 2015/0219749 A1* | 8/2015 | Dua | G01S 5/10 455/456.1 |
| 2015/0365805 A1 | 12/2015 | Bajko et al. | |
| 2016/0255604 A1 | 9/2016 | Venkatraman et al. | |
| 2016/0366548 A1 | 12/2016 | Wang et al. | |
| 2017/0280439 A1 | 9/2017 | Zhang et al. | |
| 2019/0339378 A1* | 11/2019 | Zwirn | G01S 13/878 |
| 2022/0124535 A1* | 4/2022 | Manolakos | H04B 17/391 |
| 2023/0358848 A1* | 11/2023 | Dhekne | G01S 5/0264 |

FOREIGN PATENT DOCUMENTS

WO 2019190519 A1 10/2019

* cited by examiner

*Primary Examiner* — Qutbuddin Ghulamali
(74) *Attorney, Agent, or Firm* — Merchant & Gould P.C.

(57) ABSTRACT

Fine Time Measurement (FTM) improvement for AP self-positioning may be provided. First, an Access Point (AP) graph may be generated. An AP pair may be determined for FTM AP self-positioning based on the AP graph, A plurality of Transmit (TX) signals may be sent to a paired AP of the AP pair using two more TX antennas, wherein the plurality of TX signals include FTM action frames and have a first constant Cyclic Shift Delay (CSD). A plurality of Receive (RX) signals may be received from the paired AP using two or more RX antennas, wherein the plurality of RX signals include FTM action frames and have a second constant CSD, Outlier RX signals having a low Received Signal Strength Indicator (RSSI) may be removed from the plurality of RX signals. An AP position may be determined based on the plurality of RX signals.

20 Claims, 4 Drawing Sheets

FINE TIME MEASUREMENT IMPROVEMENT FOR ACCESS POINT SELF-POSITIONING

TECHNICAL FIELD

The present disclosure relates generally to providing Fine Time Measurement (FTM) improvement for Access Point (AP) self-positioning.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
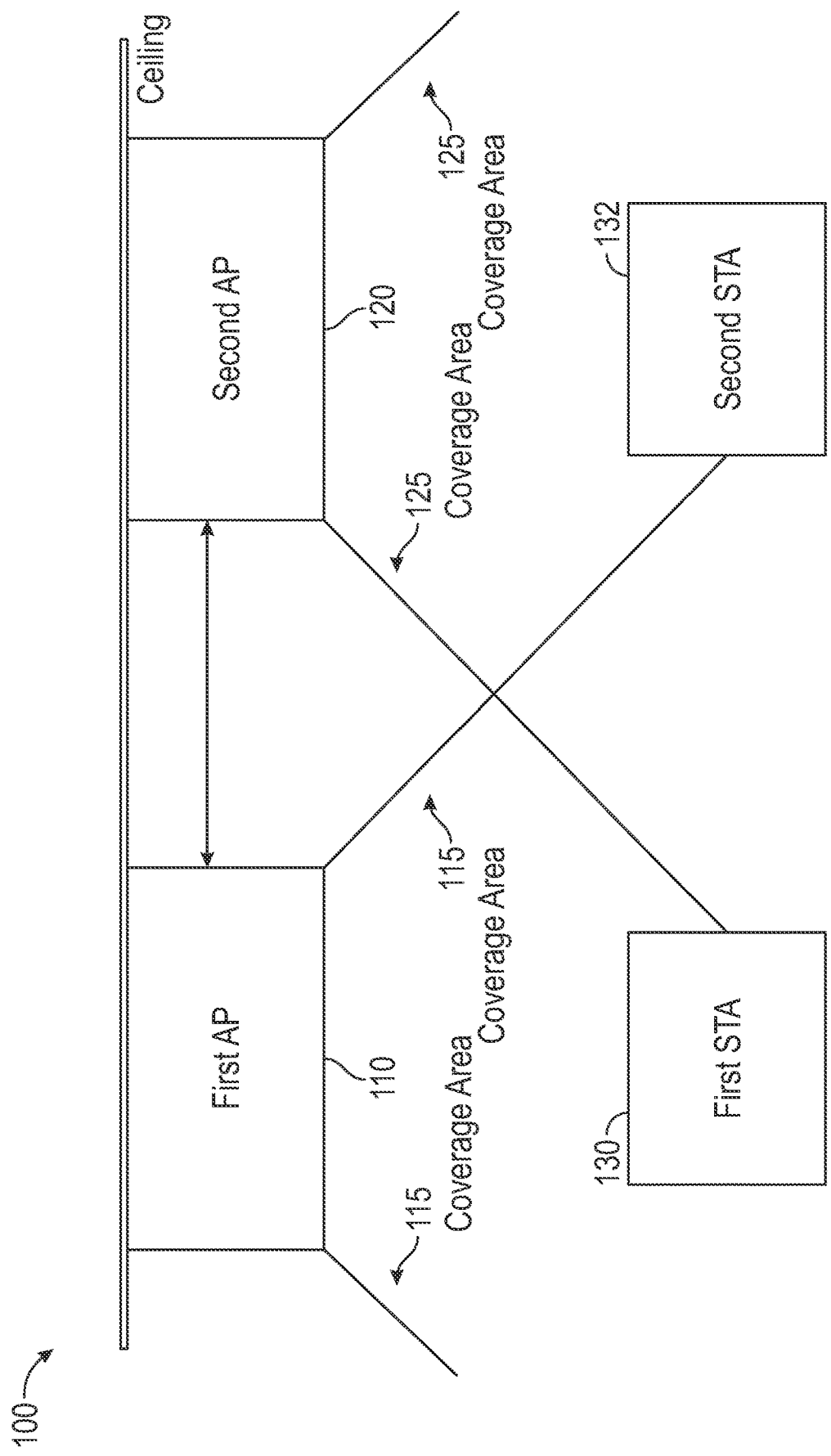
FIG. 1 a block diagram of an operating environment for Fine Time Measurement (FTM) improvement for Access Point (AP) self-positioning.

Fine Time Measurement (FTM) improvement for AP self-positioning may be provided. First, an Access Point (AP) graph may be generated. An AP pair may be determined for FTM AP self-positioning based on the AP graph, A plurality of Transmit (TX) signals may be sent to a paired AP of the AP pair using two more TX antennas, wherein the plurality of TX signals include FTM action frames and have a first constant Cyclic Shift Delay (CSD). A plurality of Receive (RX) signals may be received from the paired AP using two or more RX antennas, wherein the plurality of RX signals include FTM action frames and have a second constant CSD, Outlier RX signals having a low Received Signal Strength Indicator (RSSI) may be removed from the plurality of RX signals. An AP position may be determined based on the plurality of RX signals.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An Access Point (AP) may self-position using AP-to-AP Fine Time Measurement (FTM). APs operating in the 6 gigahertz (GHz) band may self-position via AP-to-AP FTM, because APs may need to know the AP location to operate in a standard power mode. Thus, utilizing AP-to-AP FTM may maximize or otherwise increase the number of APs allowed to operate at standard power in a network. An AP operating at standard power may have an Effective Isotropic Radiated Power (EIRP) of 36 decibels per milliwatt (dBm), a Power Spectral Density (PSD) of 23 dBm per Megahertz (dBm/MHz), and operate in the Unlicensed National Information Infrastructure (U-NII) 5 (U-NII-5) band and/or the U-NII-7 band. Standard power allocation may dramatically improve the customer experience while operating in congestion free spectrum without Rate over Range (RvR) limitations, for example due to increased Transmit (TX) power.

However, while FTM may be accurate for ranging (e.g., accurate within 50 centimeters in Line Of Site (LOS) scenarios), FTM may be sensitive to phase variations in multipath environments due to lack of coverage on the horizon for AP-to-AP. The lack of coverage may occur because traditional AP antenna design aims for omni directional coverage focused at around 30 degrees below horizon to service clients and limit AP-to-AP interferences. High phase variation at the horizon may lead to poor FTM accuracy. When there is a low Received Signal Strength Indicator (RSSI) between two APs, there may be high ranging error (e.g., sixty meters between two APs, low RSSI, and an eight meter ranging error). At low RSSI, an AP may not correctly identify the primary signal component and interpret a signal echo as the main component. Additionally, the respective positions of AP antennas may affect the communications. The typical way of performing FTM, including an initiator sending an FTM Request and a Responder sending an FTM response may therefore be inaccurate and may even fail.

FIG. 1 a block diagram of an operating environment 100 for FTM improvement for AP self-positioning. The operating environment 100 may include a first AP 110, a second AP 120, a first Station (STA) 130, and a second STA 132.

The first AP 110 may have a first directional coverage area defined by the first directional coverage area boundaries 115, and the first directional coverage area may be the area the first AP 110 aims to provide coverage. For example, the first AP 110 may provide coverage to the first AP 110 and the second STA 132 because the STAs are within the first directional coverage area. Similarly, the second AP 120 may have a second directional coverage area defined by the second directional coverage area boundaries 125, and the second directional coverage area may be the area the second AP 120 aims to provide coverage. For example, the second AP 120 may provide coverage to the second STA 132 because the second STA 132 is in the second directional coverage area.

The first AP 110 and the second AP 120 may communicate with each other to self-position. For example, the first AP 110 and the second AP 120 may self-position via FTM. However, the first AP 110 and the second AP 120 may not be in the associated coverage areas. Therefore, the first AP 110, the second AP 120, and/or other APs of the network may build an AP graph before performing FTM instead of beginning FTM by initiating the standard initiator-responder exchange.

Figure 2:
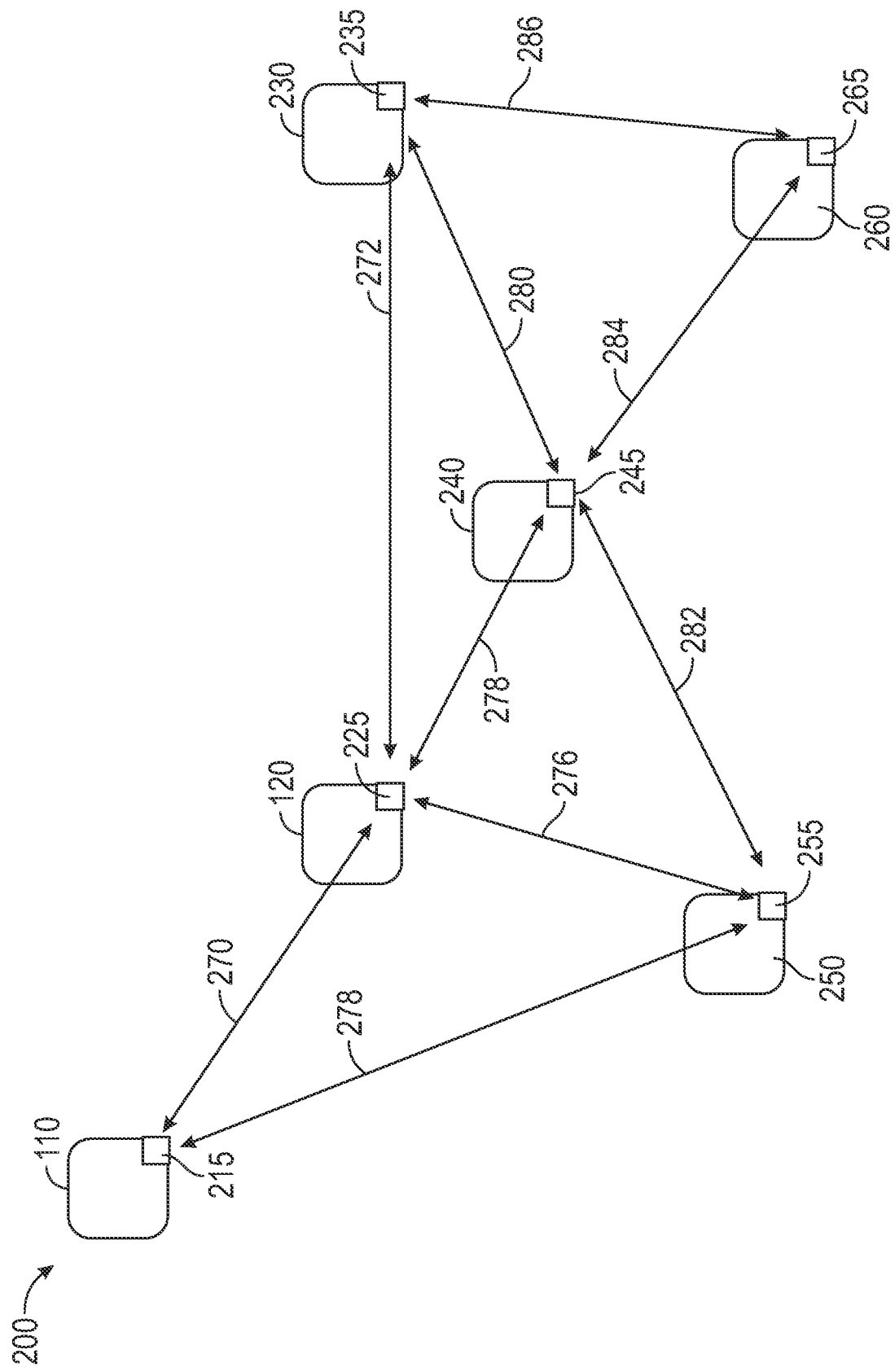
FIG. 2 is a block diagram of a network multiple APs for creating an AP graph for FTM improvement.

FIG. 2 is a block diagram of a network 200 of multiple APs for creating an AP graph for FTM improvement. The network may include the first AP 110 with a first antenna 215, the second AP 120 with a second antenna 225, a third AP 230 with a third antenna 235, a fourth AP 240 with a fourth antenna 245, a fifth AP 250 with a fifth antenna 255, and a sixth AP 260 with a sixth antenna 265.

The APs of the network 200 (e.g., the first AP 110, the second AP 120, the third AP 230, the fourth AP 240, the fifth AP 250, the sixth AP 260) may build an AP graph by sending signals to and receive signals from other APs in the network 200 to determine the RSSI associated with the signals. For example, the first AP 110 and the second AP 120 may have a first connection 270, where the first AP 110 and the second AP 120 may send signals to the other AP (e.g., using the first antenna 215 and the second antenna 225). Similarly, there may be a second connection 272 between the second AP 120 and the third AP 230, a third connection 274 between the first AP 110 and the fifth AP 250, a fourth connection 276 between the second AP 120 and the fifth AP 250, a fifth connection 278 between the second AP 120 and the fourth AP 240, a sixth connection 280 between the third AP 230 and the fourth AP 240, a seventh connection 282 between the fourth AP 240 and the fifth AP 250, an eighth connection 284 between the third AP 230 and the sixth AP 260, and a ninth connection 286 between the third AP 230 and the sixth AP 260. There may be additional connections between the APs of the network in further examples (e.g., a connection between the first AP 110 and the sixth AP 260, a connection between the third AP 230 and the fifth AP 250, etc.).

The APs of the network 200 may use the first connection 270, the second connection 272, the third connection 274, the fourth connection 276, the fifth connection 278, the sixth connection 280, the seventh connection 282, the eighth connection 284, and/or the ninth connection 286 to send and receive signals and determine the RSSI associated with communications to other APs. For example, the first AP 110 may determine the RSSI for signals sent and received to the second AP 120 using the first connection 270. The RSSI of signals may be affected by the distance between the APs communicating and/or the positions of the antennas. For example, the first AP 110 and the second AP 120 may be relatively close in position, but the first antenna 215 and the second antenna 225 may be positioned so that communications between the first AP 110 and the second AP 120 have a lower RSSI.

The APs or a controller (e.g., a Wireless Local Area Network Controller (WLC)) of the network 200 may generate the AP graph based on the RSSIs of the signals sent between the APs. For example, the relative strength of the RSSIs may be used to determine the relative positions of the APs. The affects of antenna positions may be accounted for based on comparing the RSSIs of signals between the APs.

The RSSI levels may indicate the accuracy of communications between the respective APs. For example, the accuracy of FTM ranging may increase in proportion to increasing RSSI. FTM ranging may be too inaccurate for AP self-positioning at lower RSSI levels, so an AP may determine whether FTM ranging is possible by performing FTM with another AP based on the RSSI of signals sent to and received from the another AP. The APs of the network 200 may compare the RSSI of communications to a threshold. Threshold may be a value that indicates FTM can be performed (e.g., the accuracy of FTM ranging will be acceptable).

The APs of the network may perform FTM ranging based on the AP graph. For example, AP pairs may be determined based on the AP graph, such as selecting AP pairs that have an RSSI above a threshold. FTM self-positioning may be performed via FTM communications between the AP pairs. The AP graph may indicate that FTM ranging is possible between the first AP 110 and the second AP 120, so the first AP 110 and/or the second AP 120 may perform FTM self-positioning based on sending FTM requests and FTM responses via the first connection 270. Instead of performing the standard initiator to responder FTM exchange, neighbor APs are identified using the AP, and the APs may exchange or otherwise send Request to Send (RTS), Clear to Send (CTS) and/or Packets Per Second (PPS) signals to synchronize the APs (e.g., synchronizing with the other AP in an AP pair) for exchange, thereby avoiding collisions during FTM positioning.

To improve FTM, the APs of the network 200 may send duplicate FTM Action Frames (e.g., a FTM request) using two TX antennas (e.g., an AP may have two TX antennas and two Receive (RX) antennas (a 2×2 AP) or more, such as a 4×4 AP or an 8×8 AP). The APs of the network 200 may also send FTM Action Frames at high TX power (e.g., 23 dBm or more). The range and accuracy of FTM Action Frames may be improved by sending multiple FTM Action Frames over multiple TX antennas, because the FTM Action Frames may be spatially expanded differently to the other Action Frames on available TX chains.

An AP (e.g., the first AP 110) may also send multiple packets with a constant Cyclic Shift Delay (CSD) to improve self-positioning via FTM. The AP may not add a phase shift to the multiple packets and add a shift in the frequency domain. For example, the AP may send packets with no phase shift (i.e., zero nanoseconds) and shifted in the frequency range, thereby lowering phase variation and increasing TX power. The AP may use arbitrary spatial expansion matrices for sending the packets at the constant CSD without adding a phase shift.

For an AP receiving multiple packets (e.g., the second AP 120 receiving packets from the first AP 110), the delay between transmission and reception of the packets may be constant. Thus, the receiving AP may correlate the incoming packets and correct the phase of the packets, based on the constant delay for example. For example, the receiving AP may be a 4×4 radio that receives four packets with a constant CSD, one at each RX antenna, and may correlate the four packets even when the packets are received at different times. The receiving AP may sum all possible phase combinations of the packets that add constructively and remove any outlier that has relatively low RSSI compared to the other signals. The receiving AP may lower the Signal to Noise Ratio (SNR) by correlating the packets, summing the possible phase combinations, and/or removing outliers.

In another embodiment, the AP (e.g., the first AP 110) may determine an optimum or otherwise preferred CSD (e.g., a CSD that improves the reception of the packets by a receiving AP) when sending packets by sending initial packets. The AP may use the initial packets to obtain the optimum CSD using channel sounding and evaluating Channel State Information (CSI) to determine delay that improves the reception of packets by a receiving AP (e.g., delay that helps the receiving AP sum the signals). Once the AP determines the optimum CSD, the AP may proceed with the FTM exchange including sending signals with the optimum CSD configuration for each AP pair.

A receiving AP may receive FTM Action Frames on any Radio Frequency (RF) path and/or chain. However, the receiving AP may need to avoid multipath (e.g., Non Line of Site (NLOS) signals) and determine how to send signals with minimal or otherwise low Time of Flight (ToF). The receiving AP may obtain the optimal Time of Arrival (ToA) by estimating the Channel Frequency Response (CFR) correlation matrix and then determine the delay profile of all incoming action frames from each RF chain and/or path. Thus, the receiving AP may identify peaks in the delay profile of the first signal that is received and remove outliers that have lower RSSI than the other signals. Signals with lower RSSI may be multipath signals that the receiving AP should ignore, so the receiving AP may remove these signals.

The receiving AP may also leverage the Location Measurement Report (LMR) feedback sent from the AP sending the signals (e.g., the initiating AP) in the pair to gather information on the transmitting AP TX power, RSSI, Carrier Frequency Offset (CFO), and/or phase shift feedback. APs performing FTM self-positioning may determine this information to build the AP graph.

FTM ranging may depend on several variables, including radio front end calibration. An AP may calibrate the phase delay of its radios (e.g., the RF front end) at each individual frequency and/or channel. However, an AP may have limited memory for storing pre-calibrated phase delays of all channels and/or bandwidths to recall them during run time. Moreover, calibration is an iterative, time consuming process (e.g., requiring individual tests for each channel and/or each bandwidth). Thus, many may only be calibrated for one or two channels per band. This limited calibration may lead to FTM inaccuracy whenever measurements occurs outside of a channel and/or bandwidth that has been calibrated. An AP (e.g., the first AP 110) may self-calibrate) by extrapolating the phase delay for each channel from a pre-determined group delay collected from the radio front end and already available phase delays of lower and higher channels per band. Once the AP self-calibrates the AP may accurately self-position, including when APs are not in a desired range/lobe inclusion of each other, including when APs are in NLOS, when some AP pairs are out of direct range of one another.

Figure 3:
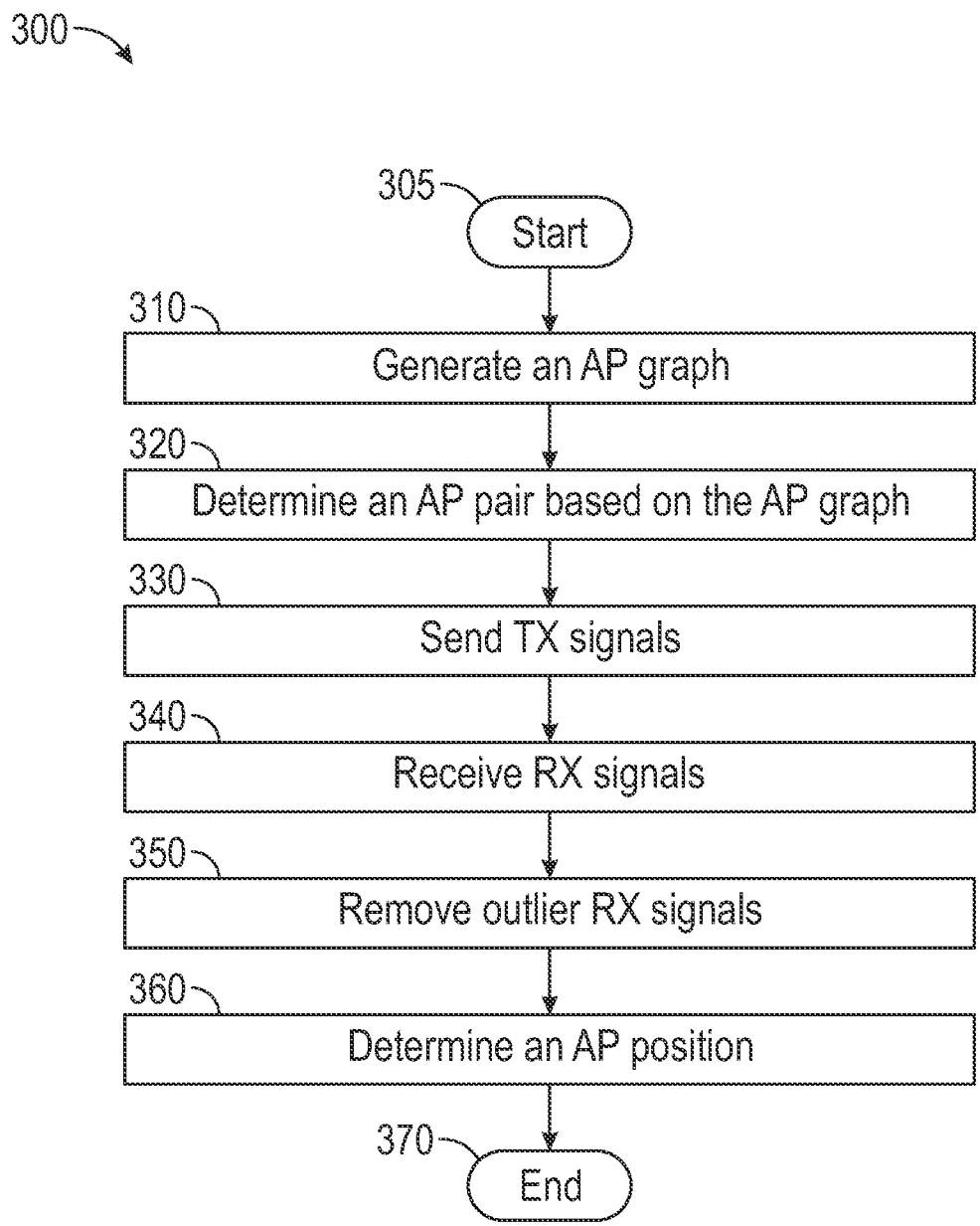
FIG. 3 is a flow chart of a method for FTM improvement for AP self-positioning.

FIG. 3 is a flow chart of a method 300 for FTM improvement for AP self-positioning. The method 300 may begin at starting block 305 and proceed to operation 310. In operation 311, AP graph may be generated. For example, one or more APs of the network 200 and/or a network controller may generate the AP graph. The AP graph may be generated using LMR feedback from APs, the RSSI of signals communicated between the APs of the network, and/or the like.

In operation 320, an AP pair may be determined based on the AP graph. For example, APs with communications having an RSSI above a threshold, as indicated by the AP graph, may be AP pairs for FTM AP self-positioning. The AP pairs may be determined to allow FTM to be performed with a desired accuracy.

In operation 330, a plurality of Transmit (TX) signals may be sent to a paired AP of the AP pair. For example, the first AP 110 may send the plurality of TX signals to the second AP 120 using two more TX antennas. The of TX signals may include FTM action frames and have a constant CSD. The constant CSD may have a phase shift of zero. Additionally, the constant CSD may be determined based on channel sounding and evaluating CSI as described above.

In operation 340 a plurality of RX signals are received from the paired AP. For example, the first AP 110 receives RX signals from the second AP 120 using two or more RX antennas. The plurality of RX signals may include FTM action frames and have a second constant CSD. In some examples the constant CSD and the second CSD are the same.

In operation 350, outlier RX signals having a low RSSI are removed from the plurality of RX signals. For example, the first AP 110 may remove outlier RX signals having a low RSSI. The first AP 110 may identify the outlier signals by estimating CFR correlation matrix, determining a delay profile of incoming action frames (e.g., on each RF frame and/or path), and identifying peaks in the profile of the first received signal.

In operation 360, an AP position may be determined based on the plurality of RX signals. For example, the AP may use the exchange of FTM action frames in operation 330 and operation 340 to perform self-position. Method 300 may conclude at ending block 370.

Figure 4:
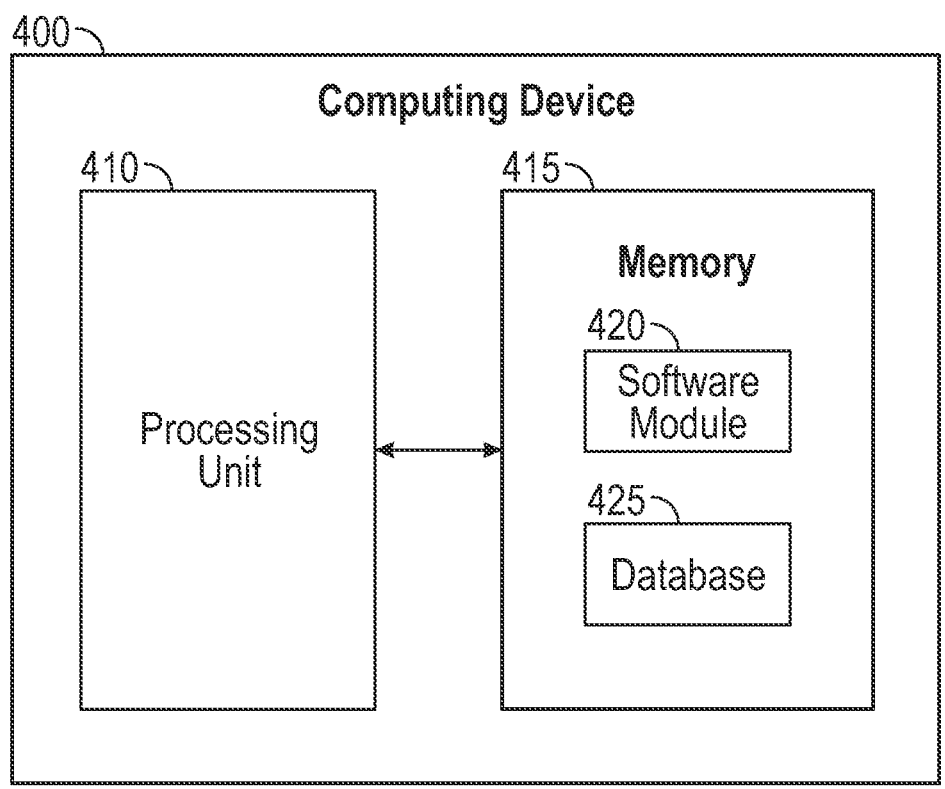
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for FTM improvement for AP self-positioning with respect to FIG. 1, FIG. 2, and FIG. 3. Computing device 400, for example, may provide an operating environment for the first AP 110, the second AP 120, the first STA 130, the second STA 132, the third AP 230, the fourth AP 240, the fifth AP 250, the sixth AP 260, and the like. The first AP 110, the second AP 120, the first STA 130, the second STA 132, the third AP 230, the fourth AP 240, the fifth AP 250, the sixth AP 260, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   generating an Access Point (AP) graph based on a Received Signal Strength Indicator (RSSI) of signals sent between APs;
   determining an AP pair based on the AP graph, wherein determining the AP pair based on the AP graph comprises selecting the AP pair in the AP graph that have the RSSI above a threshold;
   sending, to a paired AP of the AP pair, a plurality of Transmit (TX) signals using two or more TX antennas, wherein the plurality of TX signals include Fine Time Measurement (FTM) action frames and have a first constant Cyclic Shift Delay (CSD);
   receiving, from the paired AP, a plurality of Receive (RX) signals using two or more RX antennas, wherein the plurality of RX signals include FTM action frames and have a second constant CSD;
   removing, from the plurality of RX signals, outlier RX signals having a low RSSI; and
   determining an AP position based on the plurality of RX signals.

2. The method of claim 1, wherein any one of (i) the first constant CSD, (ii) the second constant CSD, or (iii) the first constant CSD and the second constant CSD includes a phase shift of zero.

3. The method of claim 1, further comprising summing all possible phase combinations of the plurality of RX signals.

4. The method of claim 1, further comprises:
   exchanging, with the paired AP, any one of (i) a Request to Send (RTS), (ii) a Clear to Send (CTS), (iii) Packets Per Second (PPS), or (iv) any combination of (i)-(iii); and
   synchronizing with the paired AP based on exchanging any one of (i) the RTS, (ii) the CTS, (iii) the PPS, or (iv) any combination of (i)-(iii).

5. The method of claim 1, further comprising:
determining the first constant CSD by using channel sounding and evaluating Channel State Information (CSI) to determine a delay that improves reception of packets by the paired AP.

6. The method of claim 1, wherein removing RX signals having a low RSSI comprises:
estimating a Channel Frequency Response (CFR) correlation matrix;
determining a delay profile of the plurality of RX signals; and
determining peaks in the delay profile from a first received signal, wherein removing the RX signals is based on the peaks in the delay profile.

7. The method of claim 1, further comprising:
receiving Location Measurement Report (LMR) feedback from the paired AP; and
determining any one of (i) a paired AP TX power, (ii) paired AP RSSI, (iii) Carrier Frequency Offset (CFO), (iv) phase shift feedback, or (v) any combination of (i)-(iv) using the LMR feedback,
wherein generating the AP graph is based on any one of (i) the paired AP TX power, (ii) paired AP RSSI, (iii) CFO, (iv) phase shift feedback, or (v) any combination of (i)-(iv).

8. The method of claim 1, further comprising:
self-calibrating by extrapolating a phase delay for each channel from a pre-determined group delay collected from a radio front end and already available phase delays of lower and higher channels per band.

9. A system comprising:
a memory storage; and
a processing unit coupled to the memory storage, wherein the processing unit is operative to:
generate an Access Point (AP) graph based on a Received Signal Strength Indicator (RSSI) of signals sent between APs;
determine an AP pair based on the AP graph, wherein the processing unit being operative to determine the AP pair based on the AP graph comprises the processing unite being operative to select the AP pair in the AP graph that have the RSSI above a threshold;
send, to a paired AP of the AP pair, a plurality of Transmit (TX) signals using two or more TX antennas, wherein the plurality of TX signals include Fine Time Measurement (FTM) action frames and have a first constant Cyclic Shift Delay (CSD);
receive, from the paired AP, a plurality of Receive (RX) signals using two or more RX antennas, wherein the plurality of RX signals include FTM action frames and have a second constant CSD;
remove, from the plurality of RX signals, outlier RX signals having a low RSSI; and
determine an AP position based on the plurality of RX signals.

10. The system of claim 9, wherein any one of (i) the first constant CSD, (ii) the second constant CSD, or (iii) the first constant CSD and the second constant CSD includes a phase shift of zero.

11. The system of claim 9, the processing unit being further operative to:
sum all possible phase combinations of the plurality of RX signals.

12. The system of claim 9, the processing unit being further operative to:
exchange, with the paired AP, any one of (i) a Request to Send (RTS), (ii) a Clear to Send (CTS), (iii) Packets Per Second (PPS), or (iv) any combination of (i)-(iii); and
synchronize with the paired AP based on exchanging any one of (i) the RTS, (ii) the CTS, (iii) the PPS, or (iv) any combination of (i)-(iii).

13. The system of claim 9, the processing unit being further operative to:
determine the first constant CSD by using channel sounding and evaluating Channel State Information (CSI) to determine a delay that improves reception of packets by the paired AP.

14. The system of claim 9, the processing unit being further operative to:
estimate a Channel Frequency Response (CFR) correlation matrix;
determine a delay profile of the plurality of RX signals; and
determine peaks in the delay profile from a first received signal, wherein removing the RX signals is based on the peaks in the delay profile.

15. A non-transitory computer-readable medium that stores a set of instructions which when executed perform a method executed by the set of instructions comprising:
generating an Access Point (AP) graph based on a Received Signal Strength Indicator (RSSI) of signals sent between APs;
determining an AP pair based on the AP graph, wherein determining the AP pair based on the AP graph comprises selecting the AP pair in the AP graph that have the RSSI above a threshold;
sending, to a paired AP of the AP pair, a plurality of Transmit (TX) signals using two or more TX antennas, wherein the plurality of TX signals include Fine Time Measurement (FTM) action frames and have a first constant Cyclic Shift Delay (CSD);
receiving, from the paired AP, a plurality of Receive (RX) signals using two or more RX antennas, wherein the plurality of RX signals include FTM action frames and have a second constant CSD;
removing, from the plurality of RX signals, outlier RX signals having a low RSSI; and
determining an AP position based on the plurality of RX signals.

16. The non-transitory computer-readable medium of claim 15, the method executed by the set of instructions further comprising:
exchanging, with the paired AP, any one of (i) a Request to Send (RTS), (ii) a Clear to Send (CTS), (iii) Packets Per Second (PPS), or (iv) any combination of (i)-(iii); and
synchronizing with the paired AP based on exchanging any one of (i) the RTS, (ii) the CTS, (iii) the PPS, or (iv) any combination of (i)-(iii).

17. The non-transitory computer-readable medium of claim 15, the method executed by the set of instructions further comprising:
determining the first constant CSD by using channel sounding and evaluating Channel State Information (CSI) to determine a delay that improves reception of packets by the paired AP.

18. The non-transitory computer-readable medium of claim 15, wherein removing RX signals having a low RSSI comprises:
estimating a Channel Frequency Response (CFR) correlation matrix;

determining a delay profile of the plurality of RX signals; and determining peaks in the delay profile from a first received signal, wherein removing the RX signals is based on the peaks in the delay profile.

19. The non-transitory computer-readable medium of claim 15, the method executed by the set of instructions further comprising:

receiving Location Measurement Report (LMR) feedback from the paired AP; and determining any one of (i) a paired AP TX power, (ii) paired AP RSSI, (iii) Carrier Frequency Offset (CFO), (iv) phase shift feedback, or (v) any combination of (i)-(iv) using the LMR feedback, wherein generating the AP graph is based on any one of (i) the paired AP TX power, (ii) paired AP RSSI, (iii) CFO, (iv) phase shift feedback, or (v) any combination of (i)-(iv).

20. The non-transitory computer-readable medium of claim 15, the method executed by the set of instructions further comprising:

self-calibrating by extrapolating a phase delay for each channel from a pre-determined group delay collected from a radio front end and already available phase delays of lower and higher channels per band.

\* \* \* \* \*